United States Patent [19]

Escallon

[11] Patent Number: 5,035,364

[45] Date of Patent: Jul. 30, 1991

[54] DEAGGLOMERATOR AND METHOD FOR DEAGGLOMERATING PARTICULATE MATERIAL

[75] Inventor: Eduardo C. Escallon, Elwood, Ind.

[73] Assignee: Terronics Development Corporation, Elwood, Ind.

[21] Appl. No.: 419,510

[22] Filed: Oct. 10, 1989

[51] Int. Cl.[5] .......... G02C 19/06
[52] U.S. Cl. .......... 241/5; 241/39
[58] Field of Search .......... 241/5, 39, 40

[56] References Cited

U.S. PATENT DOCUMENTS 2,315,083 3/1943 Chesler .......... 241/39 X
4,186,772 2/1980 Handleman .......... 241/5 X

FOREIGN PATENT DOCUMENTS 2165340 7/1973 Fed. Rep. of Germany .......... 241/39
224776 7/1985 German Democratic Rep. .......... 241/5
1282894 1/1987 U.S.S.R. .......... 241/39

*Primary Examiner*—Mark Rosenbaum
*Attorney, Agent, or Firm*—Lundy & Associates

[57] ABSTRACT

The improved deagglomerator and method of deagglomeration of the invention provides deagglomeration and/or attrition of particles within a cloud utilizing rapid particle acceleration and turbulent flow and sufficient resident time to assure deagglomeriation or attrition, and addition of a minimum of additional energy and in a manner to control bulk flow to minimize adverse effects on subsequent processes, and allowance for cloud diffusion as desired.

40 Claims, 3 Drawing Sheets

DEAGGLOMERATOR AND METHOD FOR DEAGGLOMERATING PARTICULATE MATERIAL

BACKGROUND OF THE INVENTION

The present invention relates to devices for deagglomerating particulate material, that is, reducing the size of particulate material and/or reducing the clumping of particles entrained within a flowing fluid; and more particularly, to a method for deagglomeration and/or attrition of particulate material entrained in a flowing fluid and a deagglomerator for accomplishing the same.

Various methods including electrostatic coating processes utilize particles of a selected size range dispersed in a flowing or quiescent fluid. For example in the electrostatic coating method described in U.S. Pat. No. 4,582,718 entitled "Method And Apparatus For Depositing Nonconductive Material Onto Conductive Filaments" and issued on Apr. 15, 1986 a moving substrate is exposed to a cloud of coating material particles dispersed in a carrier gas and is subjected to the influence of an electrical voltage differential.

In this application, the word "cloud" is used to refer to particulate material dispersed, suspended or entrained in a carrier gas such that the particulate material and the carrier gas move together, although the larger particles may also move under the influence of gravity. Particulate material is solid, not liquid and thus the word "cloud" is used in contrast to the word "aerosol" which is used herein to refer to liquid droplets dispersed, suspended or entrained in a carrier gas. Because of the influence of gravity, the particulate material of a "cloud" is usually less than about 40 microns in diameter.

In order to provide a uniform coating using various electrostatic coating apparatus and procedures, it is necessary to provide particles of a limited and defined range of sizes entrained within air or other carrier gas. This presents a difficulty, since even if the particles are properly sized before they are placed in the carrier gas system of a coating apparatus, spontaneous clumping may occur with the movement of the particles. Furthermore resinous particles are well known to agglomerate. This presents a need for a device for deagglomerating, that is, breaking up clumps and/or otherwise resizing particles, just prior to use.

The term "particle" within this application will be used to refer to discrete fragments of a solid material and also any clumps or other associations of discrete fragments of solid material held together electrostatically or otherwise.

Previous deagglomeration devices have a converging diverging nozzle or a divergent nozzles which separate the flow or energize the particle adjacent the wall to deagglomerate particles. Those deagglomeration devices have shortcomings in that the residence time or turbulence of flow does not allow for sufficient particle accelerations to assure deagglomeration or attrition. Furthermore, some of these prior art devices add significant energy to the particulate flow and may have adverse effects on subsequent processes.

Entraining particulate in gas flow by the use of vortecies for a variety of purposes is also taught in the prior art. Cyclone separators are well known and fluid jet grinders are also well known. However neither are used to produce a cloud of suspended particulate material.

It is therefore highly desirable to provide an improved deagglomerator and an improved method for deagglomerating and/or attrition.

It is also highly desirable to provide an improved deagglomerator and an improved method for deagglomerating which utilize sufficient residence time, rapid particle acceleration, and turbulent flow to assure deagglomeration and/or attrition.

It is also highly desirable to provide an improved deagglomerator and an improved method for deagglomerating having sufficient energy, particle velocities, residence time and turbulent flow to assure deagglomeration and/or attrition of both resinous and non-resinous particles.

It is also highly desirable to provide an improved deagglomerator and an improved method for deagglomerating utilizing minimal additional energy and high particle velocities thereby to assure particle deagglomeration and/or attrition without adverse affects caused by high fluid flow on subsequent processes.

It is finally highly desirable to provide an improved deagglomerator and an improved method for deagglomerating which includes all of the above features.

SUMMARY OF THE INVENTION

It is an object of the invention to provide an improved deagglomerator and an improved method for deagglomerating and/or attrition.

It is also an object of the invention to provide an improved deagglomerator and an improved method for deagglomerating which utilize sufficient residence time rapid particle acceleration, and turbulent flow to assure deagglomeration and/or attrition.

It is also an object of the invention to provide an improved deagglomerator and an improved method for deagglomerating having sufficient energy, particle velocities, residence time and turbulent flow to assure deagglomeration and/or attrition of both resinous and non-resinous particles.

It is also an object of the invention to provide an improved deagglomerator and an improved method for deagglomerating utilizing minimal additional energy and high particle velocities thereby to assure particle deagglomeration and/or attrition without adverse affects caused by high fluid flow on subsequent processes.

It is finally an object of the invention to provide an improved deagglomerator and an improved method for deagglomerating which includes all of the above features.

In the broader aspects of the invention there is provided a deagglomerator and a method for deagglomerating particles entrained in flowing fluid. The deagglomerator has a body having a primary fluid passage and one or more secondary fluid passages. The primary fluid passage has an entrance, an exit, and one or more intermediate portions. The intermediate portions define a main chamber. The secondary fluid passages each have an inlet and an outlet. The outlets open into the main chamber. The outlets are tangential to the main chamber. The outlets are disposed to induce fluid flowing through the secondary fluid passages to flow as one or more vortecies through the main chamber.

BRIEF DESCRIPTION OF THE DRAWINGS

The above mentioned and other features and objects of this invention and the manner of attaining them will become more apparent and the invention itself will be better understood by reference to the following description of an embodiment of the invention taken in conjunction with the accompanying drawings, wherein.

DESCRIPTION OF A SPECIFIC EMBODIMENT

Figure 1:
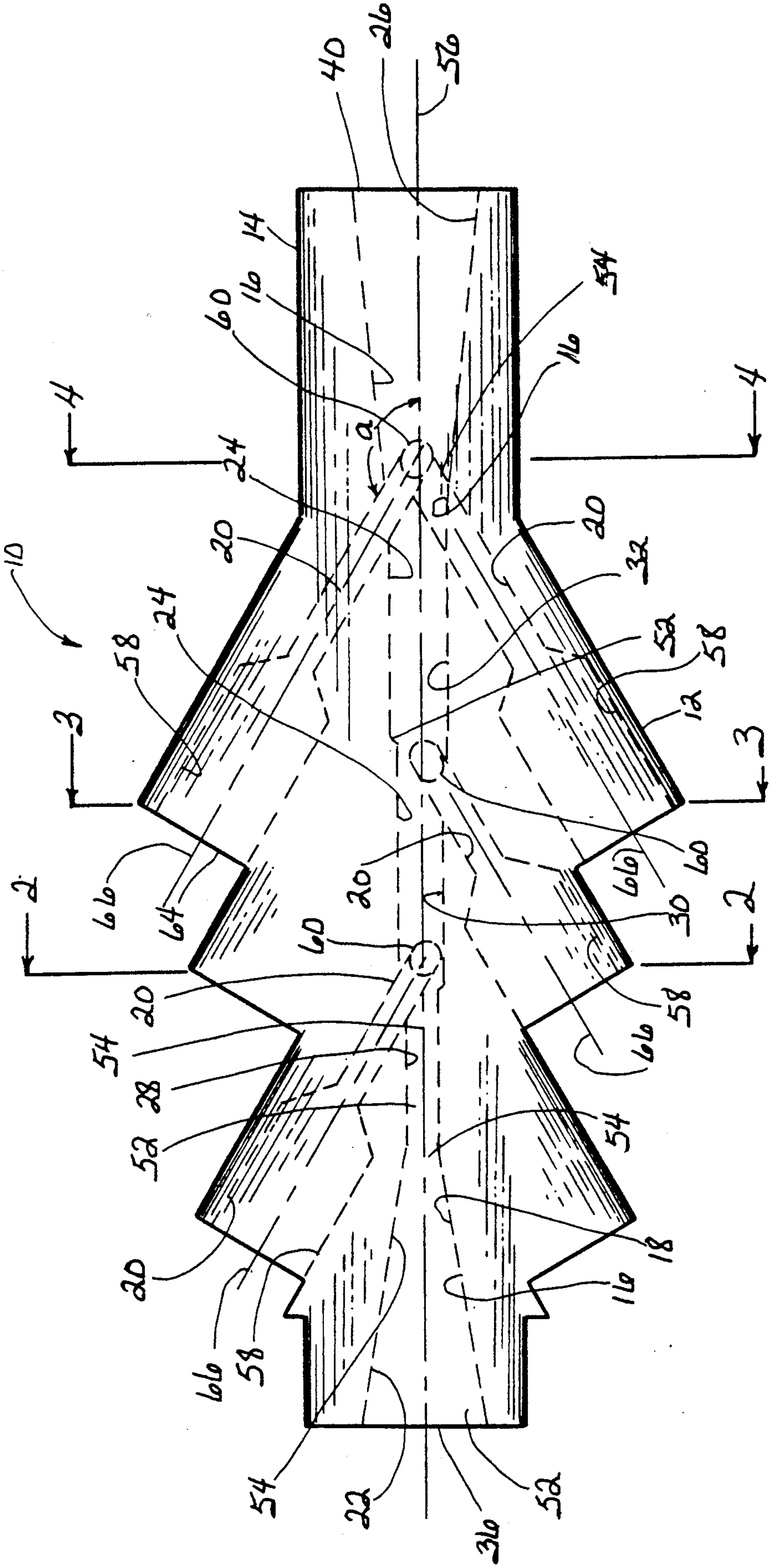
FIG. 1 is a side plan view of an embodiment of the invention illustrating both primary and secondary fluid passages in dashed lines.

Referring to FIG. 1, the deagglomerator 10 of the invention has a body 12 which has an external surface 14 and an internal surface 16. Particulate material dispersed in a fluid flows through deagglomerator left to right as shown in FIG. 1. Internal surface 16 is divided into a primary fluid passage 18 and one or more secondary fluid passages 20 which are positioned to induce one or more vortecies in the fluid flowing through primary fluid passage 18.

Primary fluid passage 18 is divided into an entrance portion 22, one or more intermediate portions 24 and an exit portion 26. Intermediate portions 24 may include a first intermediate portion 28, one or more second intermediate portions 30, and a third intermediate portion 32.

Entrance portion 22 has an entrance opening 36. Entrance portion 22, also referred to herein as converging section 22, has an internal surface 16, which has a converging conical shape. In an alternate embodiment, entrance section 22 may have an alternative cylindrical shape. Whether or not entrance portion has a converging conical shape or a cylindrical shape depends on conventional nozzle technology, i.e., the desired bulk velocity and desired low properties of the gas as it enters the first intermediate portions 24. Thus, in other alternative embodiments, entrance portion 22 may have the shape of any prior art nozzle.

Exit portion 26 has an exit opening 40. Exit portion 26 internal surface 16 has a diverging conical shape, but in an alternate embodiment may have an alternative cylindrical shape. Whether or not the exit portion 26 is cylindrical or diverging depends upon the ultimate or downstream use of the "cloud" exiting the intermediate portions 24. Where either of the bulk velocity desired downstream is less than the bulk velocity of the cloud in the intermediate portions 24 or the cloud is desirably diffused over a larger cross-sectional area than intermediate portions 24 exit portion 26 will have a diverging conical shape. Alternatively, exit portion 26 may have a diverging conical shape to interface between intermediate portions 24 and a diffuser such as disclosed in U.S. patent application entitled Electrostatic Powder Coating Apparatus and Method, Ser. No. 07/415,521, filed herewith.

Intermediate portions 24 are each circular in cross-section and internal surface 16 may be cylindrical or frusto-conical in shape. Each succeeding intermediate portion 24 may be larger in diameter than the immediately preceeding intermediate portion 24 as shown or smaller or the same size as desired.

Whether the intermediate portions are larger, smaller or the same size as the preceeding portion depends on the desired bulk velocity of the cloud flowing through primary fluid passage 18 of body 12. For example, if the bulk fluid flow is desirably maintained constant, each of the intermediate portions 24 shall have a diameter larger than the preceeding intermediate portion 24 and the cross-sectional area of the downstream or succeeding intermediate portion shall have a cross-sectional area proportionately larger than the upstream and proceeding intermediate portion to the volume of fluid added to the fluid passing through the primary fluid passage 18 by means of the secondary fluid passages 20 between the succeeding and proceeding intermediate portions. Alternatively, if the downstream or succeeding intermediate portion 24 is the same diameter or size or a smaller diameter or size, the bulk velocity of the cloud passing through the succeeding or downstream intermediate portion will be greater than the bulk velocity of the cloud flowing in the upstream or preceeding intermediate portion 24. Thus, by varying the size of succeeding or downstream intermediate portions 42, and the metering of the fluid added to the primary fluid passage through the secondary fluid passages 20, the bulk velocity of the cloud flowing through the primary fluid passages 18 can be precisely controlled.

Each intermediate portion 24 has an upstream end 52 and downstream end 54. The terms "upstream" and "downstream" and "succeeding" and "preceeding" are used in this application to refer to the net direction of fluid flow through primary fluid passage 18 of body 12 from entrance opening 36 to exit opening 40.

Secondary fluid passages 20 each have an inlet end 58 and an outlet end 60. Outlet ends 60 of secondary fluid passages 20 open into and join primary fluid passage 18. Each intermediate portion 24 is shown to have a cross-sectional area which is slightly greater than the sum of the cross-sectional area of the preceeding intermediate portion 24 plus the cross-sectional areas of the outlet ends 60 of the preceding secondary fluid passages 20. Inlet ends 58 of secondary fluid passages 20 may be adapted to receive connectors such as by being enlarged as illustrated in FIG. 1.

Figure 4:
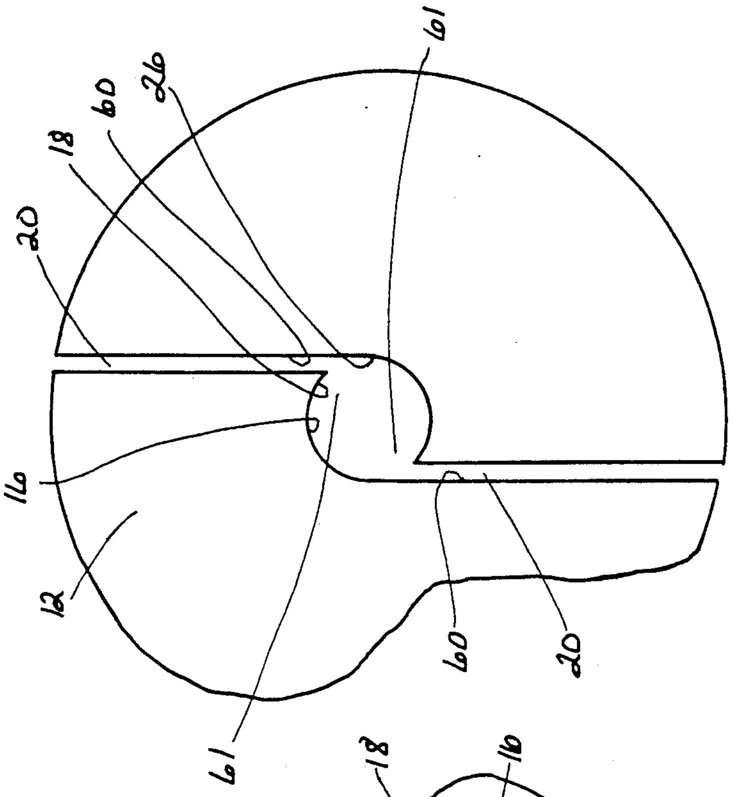
FIG. 4 is a cross-sectional view of the embodiment shown in FIG. 1 taken essentially along section line 4—4 of FIG. 1.
Figure 3:
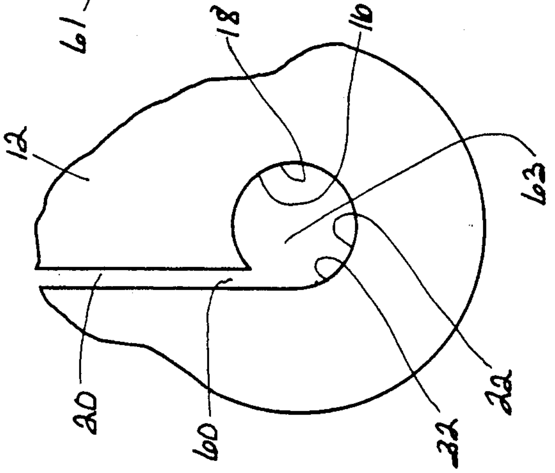
FIG. 3 is a cross-sectional view of the embodiment shown in FIG. 1 taken essentially along section line 3—3 of FIG. 1.
Figure 2:
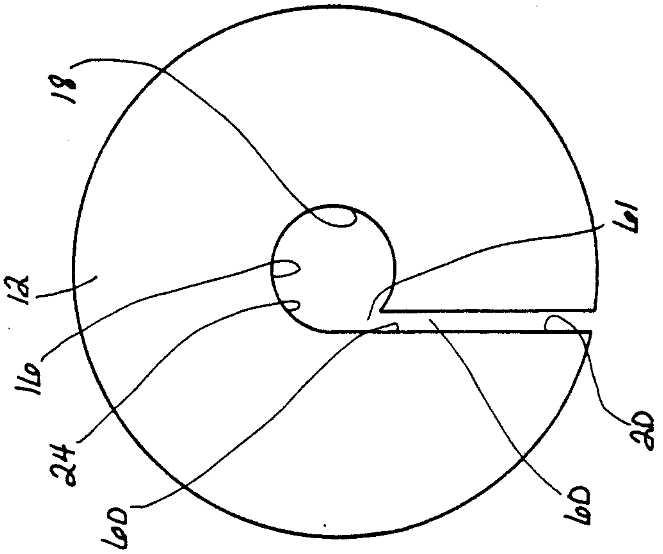
FIG. 2 is a cross-sectional view of the embodiment shown in FIG. 1 taken essentially along section line 2—2 of FIG. 1.

Outlet ends 60 of secondary fluid passages 20 open into primary passage 18 essentially tangentially as is illustrated diagrammatically in FIGS. 2, 3, and 4. In addition, outlet ends 60 of secondary fluid passages 20 may also join primary fluid passage 18 at an oblique angle "a" in the direction of exit portion 26. This angle between primary axis 56 and secondary axes 66 is always 90° or larger, and depends upon the particulate used with the specific embodiment.

Outlet ends 60 of secondary fluid passages 20 may join primary fluid passage 18 at an orientation in which fluid flowing through secondary fluid passage 20 would deflect fluid in primary fluid passage 18 in either a clockwise or a counterclockwise direction around primary axis 56. Two such outlet ends 61,63, which would induce clockwise and counterclockwise vortecies respectively, are opposite in handedness. That is, the two outlet ends 61, 63 are mirror images of each other with clockwise outlet end 61 being a mirror image of counterclockwise outlet end 63. Both outlet ends 61, 63 are directed in the direction of fluid flow. See FIGS. 2, 3, and 4.

Secondary fluid passage 20 from which fluid is deflected in one direction of rotation is followed by another secondary fluid passage 20 in which fluid is deflected in the opposite direction of rotation. In other embodiments, all secondary fluid passage 20 deflect the fluid in the same direction of rotation.

The precise selection of the angle between fluid passages 20 and axes 56 and 66 and the direction of the fluid flowing from outlets 61, 63 depends on the specific particulate, whether attrition or deagglomeration or both is desired, and whether added energy can be tolerated by subsequent processes.

Outlet ends 60 of secondary fluid passages 20 open into upstream ends 52 of second intermediate portion 28, third intermediate portion 30 and the down stream end 54 of portion 32. In modified forms of the deagglomerator 10 of the invention, additional secondary fluid passages 20 may open into some or all intermediate portions 21 and/or exit portion 26. In addition, outlet ends 60 may be positioned differently and/or additional second intermediate chambers, which may or may not include additional secondary passages 20, may also be present.

The form of degglomerator 10 of the invention illustrated in FIGS. 1 through 4 in which there are three intermediate portions 24, and outlet orifices 60 at the upstream ends 52 of second intermediate portion 28, third intermediate portion 30 and exit portion 26, and in which each succeeding secondary fluid passage 20 induces vortecies of opposite rotation, has been found to have a convenient number and location of secondary fluid passages 20 and to be useful for reducing particles larger than 40 microns in diameter to about 40 microns in diameter or smaller.

Exit portion 26 as above-mentioned may be either cylindrical in shape or diverging. If the cloud passing through primary fluid passage 18 is desirably diffused over a larger area than the cross-sectional area of the most downstream intermediate portion 24, then exit portion 26 must be of a diverging nozzle shape. It has been found that relatively homogeneous clouds may be diffused to substantially larger cross-sectional areas than the cross-sectional area of the most downstream intermediate portion 24 at a distance from the entrance of the exit portion 26 which varies depending upon the angle of the diverging walls of the exit portion 26, the proximity of the most downstream secondary passages 20 to the entrance of the exit portion 26, the velocity of the bulk fluid flowing through the primary fluid passage 18, the velocity of the secondary fluid flowing through these most downstream secondary passages 20, and the fluid and particulate material being utilized.

It has been found that the expansion area may be increased from 5 to 1 to 27 to 1 while the flow through passage 18 is only increased from 3.4 scfm to 4.6 scfm. In all cases, it has been found that the divergents of exit portion 26 of greater than an apex angle of about 120° results in a nonhomogeneous cloud within exit chamber 38. However, if a homogeneous cloud is desired at the farthest distance from the downstream end 54 of intermediate portion 30, then, the most downstream secondary passage 20 should be located at the inlet of the exit portion 26 as shown in FIG. 1.

If a homogeneous cloud is desirably shaped other than cylindrical downstream, exit portion 26 may be shaped to have lateral cross-sections other than circular. In a specific embodiment, exit portion is provided with ellipsoid cross-sections to produce a cloud which has a height greater than its width. If a homogeneous cloud is desirably further dispersed over areas larger than possible by use of a diverging exit portion 26, exit opening 40 should be connected to a diffuser such as disclosed in U.S. patent Application entitled Electrostatic Powder Coating Apparatus and Method filed herewith.

In FIG. 1, portions 22, 24, 26 of primary fluid passage 18 are all coaxial along primary axis 56. In a modified form of the deagglomerator 10 shown in FIG. 5, portions 22, 24, 26 are not coaxial, but are aligned on a bent primary axis **56/56*a*. Such bent deagglomerators 10 are useful to go around corners. Because of the unique structure of the bent deagglomerators disclosed herein, particulate accumulation at the bend is eliminated. A bent deagglomerator allows the particulate material to be dropped into the deagglomerator 10** by gravity and to be bent upwardly relatively quickly to provide a particulate cloud for a vertically aligned coating apparatus such as disclosed in U.S. Pat. No. 4,795,339 without particulate accumulation in the deagglomerator.

Figure 5:
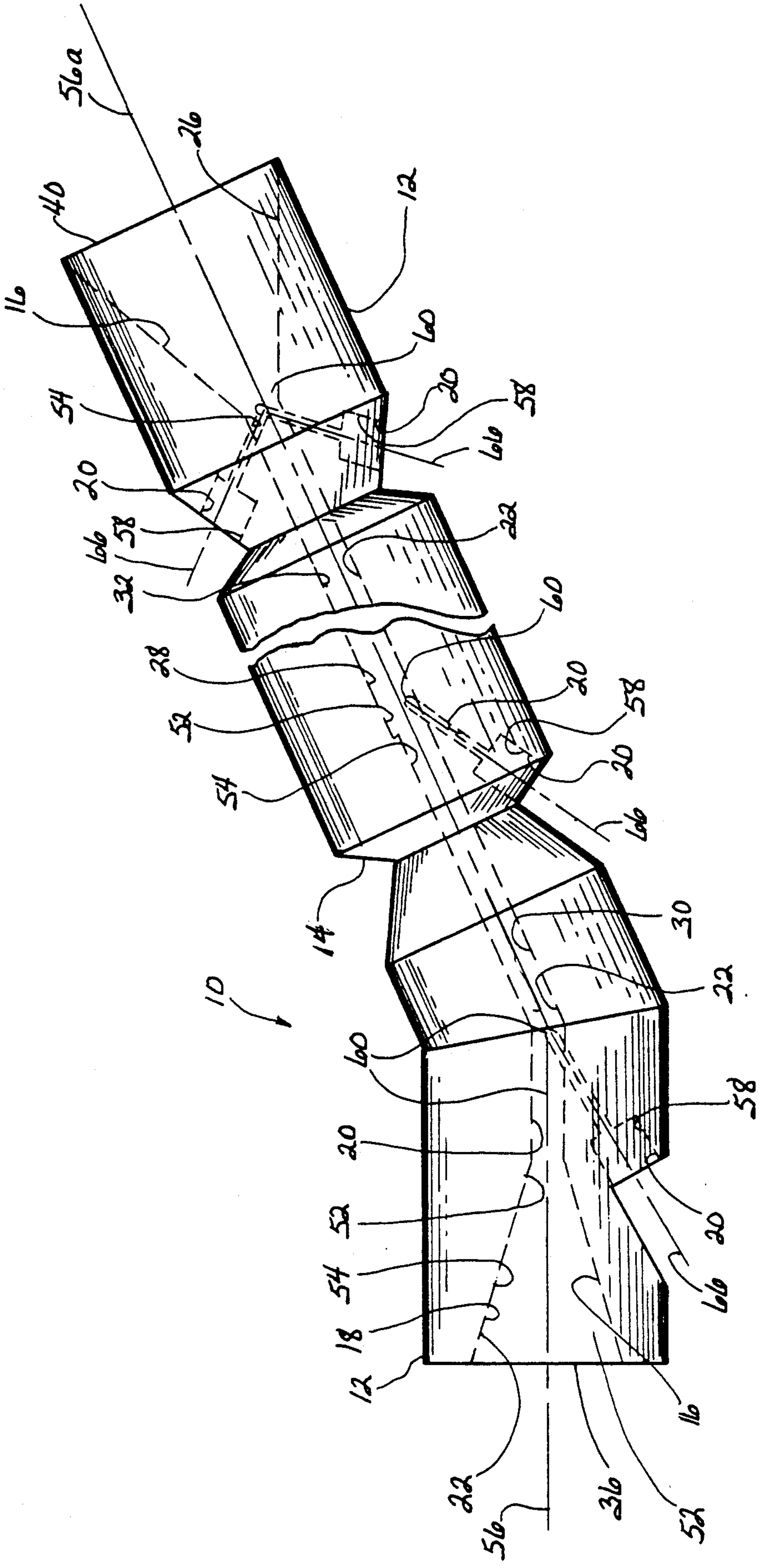
FIG. 5 is a side view of a second embodiment of the invention which is similar to the embodiment shown in FIG. 1 except for being bent between its inlet and outlet.

In FIG. 5, like reference numerals have been used to indicate like structure. In FIG. 5, deagglomerator 10 is shown broken as primary axis 56 can be bent more than once. In all "bent" deagglomerators, as shown in FIG. 5, at least one outlet 60 of a secondary fluid passage is located at the bend.

In operation, the fluid and the entrained particles to be deagglomerated are admitted into entrance portion 22 of passage 18 of the deagglomerator 10 of the invention as a cloud. The cloud flows as a fluid stream through primary fluid passage 18. Secondary fluid passages 20 are connected to one or more sources of a secondary fluid. The secondary fluid flows through secondary passages 20 into primary fluid passage 18. The secondary fluid can be the same as the primary fluid admitted through entrance chamber 34, but it is advantageous for the secondary fluid to lack entrained particles.

The flow of secondary fluid enters into the fluid stream within primary fluid passage 18 in a direction tangential to the fluid stream. This induces the fluid stream to flow as a vortex bounded by interior surface 16 of primary fluid passage 18. The velocity of the fluid stream moving through passage 18 in a direction parallel to primary axis 56 can be unchanged, increased or decreased by the addition of the secondary fluid from secondary fluid passages 20 and the proper choice of the diameter of each following intermediate portion 24 or 26.

In one embodiment, each secondary fluid passage 20 has an outlet orifice 60 which is oriented to induce a vortex of opposite rotation from the preceding vortex, the fluid stream may flow through primary fluid passage 18 first with a vortex in one direction of rotation and then with a vortex with the opposite direction of rotation. This may be repeated for a series of succeeding vortecies.

Thus, if one were to view the deagglomeration process as it occurs within passages 18 of the deagglomerator 10 in cross-section, one would see immediately downstream of each group of secondary fluid passages 20 a fluid vortex adjacent to internal surface 16 flowing transversely of primary axis 56 or primary axis **56/56*a* and a central portion of fluid flowing axially thereof. Immediately following secondary fluid passages 20, the area of the centrally located axial fluid flow is usually significantly larger than the peripheral area of the vortex fluid flow. However, the area of the vortex fluid flow increases and the central axial flow decreases downstream of secondary fluid passages 20 and ultimately if no additional secondary fluid passages 20** are located downstream will result in all fluid flow being axial.

It is believed that the actual deagglomeration process is a result of various fluid dynamic forces on the particles including forces which occur as a result of the interactions of the fluid and the particles in the vortecies including shear, centripetal forces, and boundary layer drag, all acting to oppose inertial forces.

Thus, deagglomeration and attrition in the deagglomerator 10 of the invention may occur at any one of four locations within deagglomerator 10. First, deagglomeration and/or attrition may occur where fluid is inserted into the primary fluid passage 18 by secondary fluid passages 20. Secondly, deagglomeration and/or attrition may occur at the interface between any one of the vortecies with the bulk axial flow. Thirdly, deagglomeration and/or attrition may occur at the impingement of exiting fluid from passages 20 into an existing vortex within primary fluid passage 18, and fourthly, deagglomeration and/or attrition may occur when the particulate material is first inserted into the fluid flow to first form the cloud prior to entrance into the primary fluid passages 18.

The improved deagglomerator and method of deagglomeration of the invention provides deagglomeration and/or attrition of particles within the cloud utilizing rapid particle acceleration and turbulent flow and sufficient resident time to assure deagglomeration or attrition, addition of a minimum of additional energy and in a manner to control bulk flow to minimize adverse effects on subsequent processes, and allowance for cloud diffusion as desired.

While there have been described above the principles of this invention in connection with a preferred embodiment, it is to be clearly understood that this description is made only by way of example and not as a limitation to the scope of the claims which are appended hereto.

What is claimed is:

1. A deagglomerator comprising a body, said body having an inlet port and an outlet port and a central passage extending therethrough connecting said inlet and outlet ports, said central passage having a wall and a longitudinal axis, a plurality of injection passages, a plurality of inlet ports and tangential outlet ports, said injection passages connecting said inlet and outlet ports, respectively, said injection passages being aligned within said body such that said injection outlet ports intersect said central passage, said injection passages and outlet ports being aligned within said body to inject fluid into fluid flowing through said central passage with a flow component which is transverse to said longitudinal axis to produce a vortex flow adjacent to said wall.

2. The apparatus of claim 1 wherein said plurality of said injection passages are consecutively positioned along length of said central passage and are aligned alternatively to inject fluid into said central passage in opposite directions.

3. The apparatus of claim 1 wherein said plurality of said injection passages are consecutively positioned along said central passage and are aligned to inject fluid into said passage in the same direction.

4. The apparatus of claim 1 wherein said injection passages are consecutively positioned along said central passage and are aligned alternatively to produce clockwise and counterclockwise vortex flow.

5. The apparatus of claim 1 wherein said plurality of injection passages are consecutively positioned along said central passage and are aligned to inject fluid into said passage to flow in the same direction as fluid flowing in said central passage.

6. The apparatus of claim 5 wherein said plurality of injection passages each define an acute angle with said central passage between 0° and 90°, inclusive.

7. The apparatus of claim 1 wherein said central passage has an entrance section, said entrance section being connected to said inlet port, and at least one cylindrical section contiguous to said entrance section and coaxial therewith, said tangential passages intersecting said cylindrical section.

8. The apparatus of claim 7 wherein said entrance section converges.

9. The apparatus of claim 7 further comprising a diverging section having a first end and a second larger end, said diverging section being between said cylindrical sections and said outlet port, said first end being connected to one of said cylindrical sections, said second end being connected to said outlet port.

10. The apparatus of claim 9 wherein said cylindrical sections comprise a plurality of cylindrical sections of different diammetral size aligned coaxially end to end between said entrance section and said outlet port, said cylindrical sections being arranged in order of decreasing diameter with the smallest diameter being contiguous to said diverging section.

11. The apparatus of claim 10 wherein at least one of said injection passages intersects each of said cylindrical sections.

12. The apparatus of claim 11 wherein the diameters of said injection passages and each of said cylindrical sections are chosen with the fluid pressure and temperature to provide for generally constant flow through said central passage.

13. The apparatus of claim 11 wherein the diameters of said injection passages and each of said cylindrical sections are chosen with the fluid pressure and temperature to provide for generally increased flow through said central passage.

14. The apparatus of claim 11 wherein the diameters of said injection passages and each of said cylindrical sections are chosen with the fluid pressure and temperature to provide for generally decreased flow through said central passage.

15. The apparatus of claim 9 wherein at least one of said injection passages intersects said diverging section.

16. The apparatus of claim 7 wherein said cylindrical section comprises a plurality of cylindrical sections of different diammetral size aligned coaxially end to end between said entrance section and said outlet port, said cylindrical sections being arranged in order of increasing diameter with the smallest diameter being contiguous to said diverging section.

17. The apparatus of claim 16 wherein at least one of said injection passages intersects each of said cylindrical sections.

18. The apparatus of claim 17 wherein the diameters of said injection passages and each of said cylindrical sections are chosen with the fluid pressure and temperature to provide for generally constant flow through said central passage.

19. The apparatus of claim 17 wherein the diameters of said tangential injection passages and each of said cylindrical sections are chosen with the fluid pressure and temperature to provide for generally increased flow through said central passage.

20. The apparatus of claim 17 wherein the diameters of said injection passages and each of said cylindrical sections are chosen with the fluid pressure and temperature to provide for generally decreased flow through said central passage.

21. The apparatus of claim 7 wherein one of said cylindrical sections is bent, and said bent cylindrical section having longitudinal axes which define an angle between 0° and 120°, inclusive, at least one injection passage intersection said bent cylindrical section at the apex of said angle.

22. A deagglomeration device for aerodynamically affecting size reduction in agglomerations of particulate material comprising means for injecting a particulate material into a flow of fluid, means for entraining said particulate material in said flow of fluid, means for injecting additional fluid into said flow of fluid with a flow component transverse to said flow of fluid whereby a portion of said flow of fluid defines a peripheral vortex flow and another portion of said flow of fluid defines a central axial flow, the volume of fluid in said vortex flow decreasing downstream of the injection of said additional fluid, the volume of said fluid in said central axial flow increasing downstream of the injection of said additional fluid.

23. The apparatus of claim 22 further comprising means for dispersing said fluid and particulate flow into a homogeneous dilute flow downstream of said injection of said additional fluid.

24. The apparatus of claim 22 wherein there are a plurality of said injection means.

25. The apparatus of claim 24 wherein said injection means are selected to alternately cause vortex flow in opposite directions to each other.

26. The apparatus of claim 25 wherein rate of fluid flow is relatively constant throughout the apparatus.

27. The apparatus of claim 24 wherein the rate of fluid flow increases downstream.

28. The apparatus of claim 24 wherein the rate of fluid flow decreases downstream.

29. The apparatus of claim 22 wherein said injecting step is in the direction of fluid flow.

30. A deagglomeration device for aerodynamically affecting size reduction in aggregations of particulate material comprising a body having a central passage extending therethrough, an inlet port, and an exit port, said central passage connecting said inlet and exit ports, said central passage having a first conical converging section connected to said inlet port, a plurality of cylindrical sections coaxially aligned with said converging section, said cylindrical sections being arranged end to end in order of increasing diameter between said converging section and said exit port coaxially therewith, a plurality of tangential injection passages, each injection passage tangentially intersecting said central passage, at least one of said injection passages intersecting each of said cylindrical sections.

31. The apparatus of claim 30 wherein said plurality of said tangential injection passages are consecutively positioned along length of said central passage and are aligned alternatively to inject fluid into said central passage in opposite directions.

32. The apparatus of claim 30 wherein said plurality of said tangential injection passages are consecutively positioned along said central passage and are aligned to inject fluid into said passage in the same direction.

33. The apparatus of claim 30 wherein said tangential injection passages are consecutively positioned along said central passage and are aligned alternatively to produce clockwise and counterclockwise vortex flow.

34. The apparatus of claim 30 wherein said plurality of injection passages are consecutively positioned along said central passage and are aligned to inject fluid into said passage to flow in the same direction as fluid flowing in said central passage.

35. The apparatus of claim 34 wherein said plurality of injection passages each define an acute angle with said central passage between 0° and 90°, inclusive.

36. The apparatus of claim 30 further comprising a diverging section having a first end and a second larger end, said diverging section being between said cylindrical sections and said outlet port, said first end being connected to one of said cylindrical sections, said second end being connected to said outlet port.

37. The apparatus of claim 36 wherein at least one of said tangential injection passages intersects said diverging section.

38. The apparatus of claim 30 wherein one of said cylindrical sections is bent, and said bent cylindrical section having longitudinal axes which define an angle between about 0° and about 120°, inclusive, at least one injection passage intersecting said bent cylindrical section at the apex of said angle.

39. A method of aerodynamically deagglomerating aggregations of particulate material comprising
introducing a particulate into a flowing fluid, entraining said particulate material in said flowing fluid, tangentially injecting additional fluid into said flowing fluid thereby forming a peripheral vortex flow and a central axial flow, repeating said injecting steps a plurality of times, alternating the direction flow of said vortexes, and dispersing said fluid and entrained particulate into a generally homogeneous fluid a plurality into a generally homogeneous fluid a plurality of magnitudes larger in volume.

40. A method of aerodynamically deagglomerating aggregations of particulate material comprising passing a fluid through a passage, introducing a particulate material into said fluid, entraining said particulate material in said fluid, creating aerodynamic fluid shear forces by directing said fluid through a converging section of said passage, a cylindrical section of said passage and a diverging section of said passage thereby causing velocity differentials and boundary layer phenomenon, injecting additional fluid into select sections of said passage with a flow component transverse to said fluid flow thereby producing a peripheral vortex flow adjacent to the wall of said passage and a central axial flow and creating additional aerodynamic fluid shear forces upon said particulate material, and outletting said entrained particulate from said passage.

* * * * *